US012619180B2

(12) United States Patent
Fujiwara

(10) Patent No.: US 12,619,180 B2
(45) Date of Patent: May 5, 2026

(54) HEATING DEVICE, FIXING DEVICE, AND IMAGE FORMING APPARATUS

(71) Applicant: Hitoshi Fujiwara, Kanagawa (JP)

(72) Inventor: Hitoshi Fujiwara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/977,920

(22) Filed: Dec. 12, 2024

(65) Prior Publication Data

US 2025/0199443 A1 Jun. 19, 2025

(30) Foreign Application Priority Data

Dec. 18, 2023 (JP) ................................ 2023-212947

(51) Int. Cl.
*G03G 15/20* (2006.01)

(52) U.S. Cl.
CPC ..... *G03G 15/2039* (2013.01); *G03G 15/2053* (2013.01); *G03G 15/2064* (2013.01)

(58) Field of Classification Search
CPC ........... G03G 15/2053; G03G 15/2064; G03G 2215/2035; G03G 15/2039; G03G 15/2042
See application file for complete search history.

(56) References Cited

U.S. PATENT DOCUMENTS

| | | | | |
|---|---|---|---|---|
| 2020/0401068 A1 | 12/2020 | Matsuda et al. | | |
| 2021/0011400 A1 | 1/2021 | Seshita et al. | | |
| 2021/0026279 A1* | 1/2021 | Takahashi | .......... | G03G 15/2017 |
| 2022/0004128 A1* | 1/2022 | Adachi | .............. | G03G 15/2053 |
| 2022/0075302 A1 | 3/2022 | Iwaya et al. | | |
| 2022/0291610 A1 | 9/2022 | Seki et al. | | |
| 2022/0397847 A1* | 12/2022 | Fujiwara | ............ | G03G 15/2053 |

FOREIGN PATENT DOCUMENTS

| | | | | |
|---|---|---|---|---|
| JP | 2002110313 | A | * | 4/2002 |
| JP | 2008-275756 | A | | 11/2008 |
| JP | 2010-282054 | A | | 12/2010 |
| JP | 2015-138113 | A | | 7/2015 |
| JP | 2018-004922 | A | | 1/2018 |
| JP | 2018-013647 | A | | 1/2018 |
| JP | 2018-112669 | A | | 7/2018 |
| JP | 2019-007989 | A | | 1/2019 |
| JP | 2020-181085 | A | | 11/2020 |
| JP | 2022-140086 | A | | 9/2022 |

OTHER PUBLICATIONS

English Translation of JP 2002110313 (Year: 2002).*

* cited by examiner

*Primary Examiner* — Jessica L Eley
(74) *Attorney, Agent, or Firm* — XSENSUS LLP

(57) ABSTRACT

A heating device includes a heater, a temperature sensor, an elastic body, and a receiver. The temperature sensor detects a temperature of the heater. The elastic body extends from one end to another end to press the temperature sensor against the heater at the one end in a pressing direction. The receiver has a contact face contacting and receiving said another end of the elastic body. The receiver covers the elastic body to conceal the elastic body from outside of the receiver. The receiver has a hole penetrating through the receiver on the contact face. Said another end of the elastic body is disposed adjacent to the hole, and a part of the elastic body is visible from the hole.

20 Claims, 10 Drawing Sheets

HEATING DEVICE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-212947, filed on Dec. 18, 2023, in the Japan Patent Office, the entire disclosure of which is hereby incorporated by reference herein.

BACKGROUND

Technical Field

The present disclosure relates to a heating device, a fixing device, and an image forming apparatus.

Related Art

An image forming apparatus known in the art such as a copier or a printer includes a fixing device as an example of a heating device. The fixing device heats a sheet to fix an image onto the sheet.

A typical fixing device includes a pair of rotators contacting each other to form a nip and a heater heating at least one of the rotators. After the heater heats one of or both rotators to a predetermined temperature, a sheet enters a nip between the rotators to apply heat and pressure to an unfixed image on the sheet, and the unfixed image is fixed onto the sheet. The fixing device includes a temperature sensor such as a thermistor or a thermostat that detects the temperature of the heater or the rotator in order to appropriately maintain the temperature of the heater and prevent an excessive temperature rise.

SUMMARY

This specification describes an improved heating device that includes a heater, a temperature sensor, an elastic body, and a receiver. The temperature sensor detects a temperature of the heater. The elastic body extends from one end to another end to press the temperature sensor against the heater at the one end in a pressing direction. The receiver has a contact face contacting and receiving said another end of the elastic body. The receiver covers the elastic body to conceal the elastic body from outside of the receiver. The receiver has a hole penetrating through the receiver on the contact face. Said another end of the elastic body is disposed adjacent to the hole, and a part of the elastic body is visible from the hole.

This specification also describes a fixing device that includes the heating device and an image forming apparatus that includes the heating device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
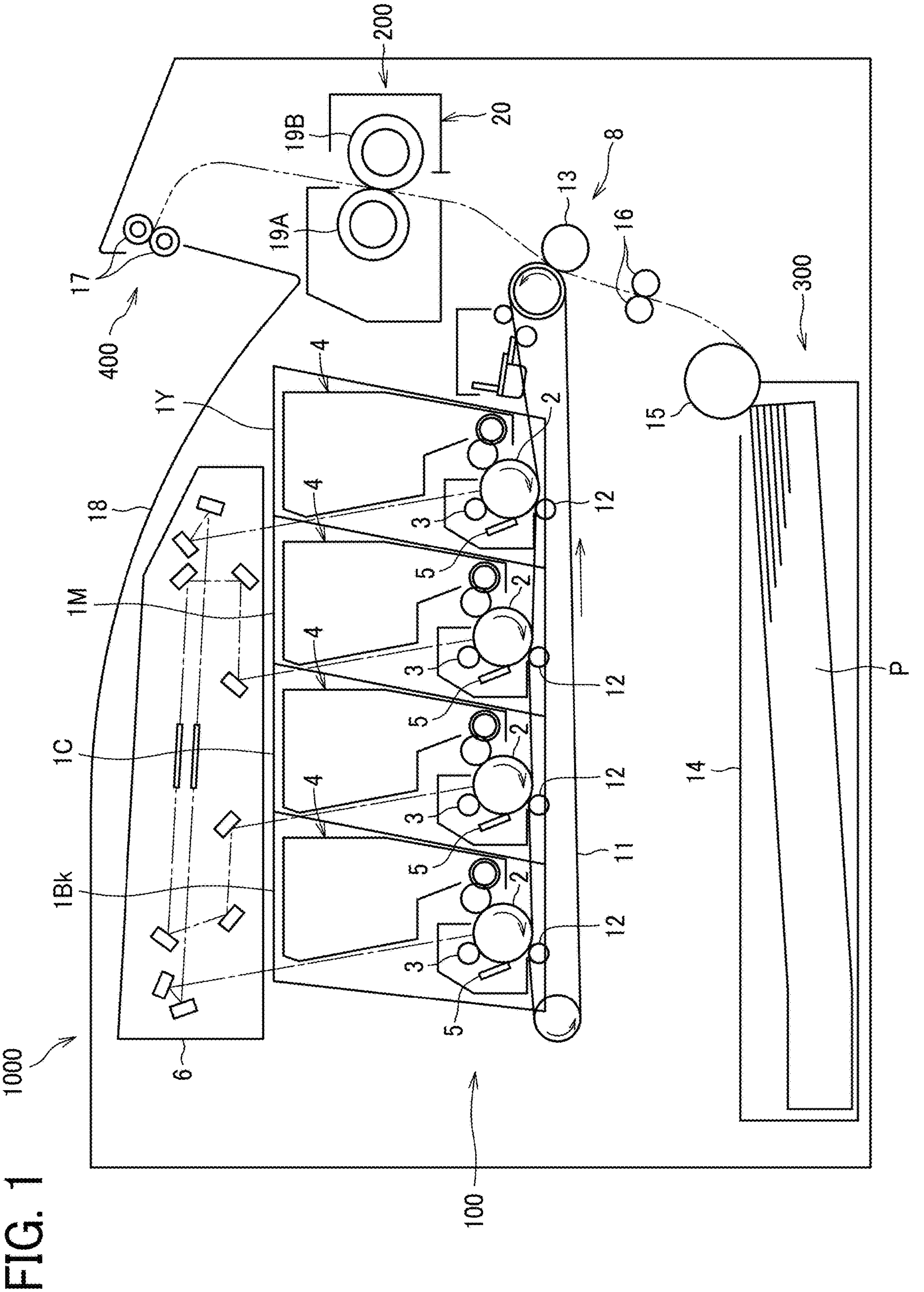
FIG. 1 is a schematic diagram illustrating a configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings for illustrating embodiments of the present disclosure, elements or components identical or similar in function or shape are given identical reference numerals as far as distinguishable, and redundant descriptions are omitted.

<Structure of Image Forming Apparatus>

FIG. 1 is a schematic diagram illustrating a configuration of an image forming apparatus 1000. In the following description, the "image forming apparatus" includes a printer, a copier, a facsimile machine, or a multifunction peripheral having at least two of printing, copying, scanning, and facsimile functions. "Image formation" means the formation of images with meanings such as characters and figures and the formation of images with no meanings such as patterns. With reference to FIG. 1, a description is given below of the overall configuration and operation of the image forming apparatus 1000.

As illustrated in FIG. 1, the image forming apparatus 1000 includes an image forming section 100, a fixing section 200, a sheet feeder 300, and a sheet ejection section 400.

(Image Forming Section)

The image forming section 100 forms an image on a sheet as a recording medium. The image forming section 100 includes four image forming units 1Y, 1M, 1C, and 1Bk, an exposure device 6, and a transfer device 8.

Each of the four image forming units 1Y, 1M, 1C, and 1Bk includes a photoconductor 2, a charger 3, a developing device 4, and a cleaner 5.

The photoconductor 2 bears an electrostatic latent image on the surface of the photoconductor 2 and rotates. Examples of the photoconductor 2 include an endless-shaped photoconductor belt in addition to a drum-shaped photoconductor. The drum-shaped photoconductor 2 is, for example, an inorganic photoconductor such as amorphous silicon or selenium, or an organic photoconductor such as titanyl phthalocyanine. As the organic photoconductor, there are a laminated type photoconductor and a single-layer type photoconductor. The laminated type photoconductor has a laminated structure containing a layer (a charge generation layer) in which charge-generating materials such as non-metallic phthalocyanine or titanyl phthalocyanine are dispersed in a binder resin and a layer (a charge transport layer) in which charge transport materials are dispersed in a binder resin. These layers are stacked on a support such as an aluminum drum. The single-layer type photoconductor has a single-layer structure with a photosensitive layer containing both charge-generating materials and charge-transport materials dispersed in a binder resin on a support. In the single-layer type photoconductor, it is also possible to add hole transport agents and electron transport agents as charge transport materials to the photosensitive layer. Additionally, the option exists to include an undercoat layer between the support and either the charge-generation layer in the laminated type photoconductor or the photosensitive layer in the single-layer type photoconductor.

The charger 3 charges the surface of the photoconductor 2. The charging system of the charger 3 is not limited to a particular system as long as the charger 3 applies a voltage to the surface of the photoconductor 2 to uniformly charge the surface of the photoconductor 2. The charging system of the charger 3 can be selected as appropriate depending on the purpose. Specifically, examples of the charger 3 include a contact type charger such as a conductive or semiconductive charging roller, a magnetic brush, a fur brush, a film, or a rubber blade, and a non-contact type charger using corona discharge.

The developing device 4 supplies toner as the developer to the electrostatic latent image on the photoconductor 2 to form a toner image. The developing devices 4 accommodate toners (developers) of different colors such as yellow, magenta, cyan, and black in the image forming units 1Y, 1M, 1C, and 1Bk, respectively, corresponding to color separation components of a color image.

The cleaner 5 removes the toner and other foreign matters remaining on the photoconductor 2. Examples of the cleaner 5 include a cleaning blade disposed to be in contact with the surface of the photoconductor 2.

The exposure device 6 exposes the charged surface of the photoconductor 2 to form the electrostatic latent image on the surface of the photoconductor 2.

The exposure system of the exposure device 6 is not limited to a particular system as long as the exposure device 6 can expose the charged surface of the photoconductor 2 and can be appropriately selected depending on the purpose. Specific examples of the exposure device include various exposure devices such as a copying optical system, a rod lens array system, a laser optical system, a liquid crystal shutter optical system, and an LED optical system.

The transfer device 8 transfers an image onto a sheet. The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside the loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. On the other hand, the secondary transfer roller 13 contacts an outer circumferential surface of the intermediate transfer belt 11 to form a secondary transfer nip between the secondary transfer roller 13 and the intermediate transfer belt 11. An elastic intermediate transfer belt may be used as the intermediate transfer belt 11. The elastic intermediate transfer belt may include, for example, a rigid base layer having relatively flexibility and a flexible elastic layer layered on the base layer.

In addition, the intermediate transfer belt 11 may include a guide on the inner circumferential surface of the intermediate transfer belt to prevent the intermediate transfer belt 11 from meandering.

(Fixing Section)

The fixing section 200 includes a fixing device 20 that heats the sheet to fix the image on the sheet. The fixing device 20 includes a pair of rotators 19A and 19B contacting each other and a heater heating at least one of the pair of rotators 19A and 19B.

(Sheet Feeder)

The sheet feeder 300 supplies the sheet to the image forming section 100. The sheet feeder 300 includes a sheet tray 14 to store sheets P and a feed roller 15 to feed the sheet P from the sheet tray 14. Examples of the "sheet" include not only a sheet of paper but also an overhead projector (OHP) transparency sheet, a fabric, a metallic sheet, a plastic film, and a prepreg sheet including carbon fibers previously impregnated with resin. Examples of the "sheet" further include thick paper, a postcard, an envelope, thin paper, coated paper (e.g., coat paper and art paper), and tracing paper, in addition to plain paper.

(Sheet Ejection Section)

The sheet ejection section 400 ejects the sheet P to the outside of the image forming apparatus 1000. The sheet ejection section 400 includes an output roller pair 17 to eject the sheet P to the outside of the image forming apparatus 1000 and an output tray 18 to place the sheet P ejected by the output roller pair 17.

<Image Forming Operation>

With continued reference to FIG. 1, the image forming operation of the image forming apparatus 1000 is described below.

The image forming operation is started in response to an instruction from an operation panel or external terminals. In each of the image forming units 1Y, 1M, 1C, and 1Bk, the photoconductor 2 starts rotating. Subsequently, the charger 3 uniformly charges the surface of the photoconductor 2 to a high electric potential. Based on image data of a document read by a document reading device or print data instructed to print by a terminal, the exposure device 6 exposes the charged surface of each of the photoconductors 2. As a result, the electric potential at an exposed portion on the surface of each of the photoconductors 2 is decreased. Thus, the electrostatic latent image is formed on the surface of each of the photoconductors 2. The developing devices 4 supply toners to the photoconductors 2, respectively, to form toner images of different colors on the photoconductors 2, respectively.

As the photoconductors 2 rotate, the toner images on the photoconductors 2 reach primary transfer nips defined by the positions of the primary transfer rollers 12, respectively. At the primary transfer nips, the toner images are transferred from the photoconductors 2 onto the intermediate transfer belt 11 driven to rotate so as to be sequentially superimposed on one another. Thus, the full-color toner image is formed on the intermediate transfer belt 11.

The image forming operation is not limited to the above-described full color image forming operation that uses all four image forming units 1Y, 1M, 1C, and 1Bk. Alternatively, the image forming apparatus 1000 can form a monochrome toner image by using any one of the four image forming units 1Y, 1M, 1C, and 1Bk, or can form a bicolor toner image or a tricolor toner image by using two or three of the image forming units 1Y, 1M, 1C, and 1Bk. After the toner image is transferred to the intermediate transfer belt 11, the cleaner 5 removes residual toner that are remained on the photoconductor 2 from the surface of the photoconductor 2. As a result, the cleaner 5 removes foreign matter such as residual toner on the photoconductor 2.

The full-color toner image transferred to the intermediate transfer belt 11 is conveyed to the secondary transfer nip defined by the secondary transfer roller 13 in accordance with rotation of the intermediate transfer belt 11. At the secondary transfer nip, the full-color toner image is transferred from the intermediate transfer belt 11 onto the sheet P. The sheet P is fed from the sheet feeder 300. After the start of the image forming operation, the feed roller 15 rotates to feed the sheet P from the sheet tray 14. Before the sheet P reaches the secondary transfer nip, the sheet P fed from the sheet tray 14 is brought into contact with a timing roller pair 16 and temporarily stopped. After the sheet P is temporarily stopped, the timing roller pair 16 is rotated at a predetermined time to convey the sheet P to the secondary transfer nip in synchronization with the full-color toner image formed on the intermediate transfer belt 11 reaching the secondary transfer nip. As a result, the full-color toner image is transferred to the sheet P.

The sheet P bearing the full-color toner image is conveyed to the fixing section 200. In the fixing section 200, the sheet P passes between the pair of rotators 19A and 19B, and thus the full-color toner image on the sheet P is heated and pressed to fix the full-color toner image to the sheet P. Then, the sheet P bearing the fixed toner image is conveyed to the sheet ejection section 400. In the sheet ejection section 400, the output roller pair 17 ejects the sheet P onto the output tray 18. Thus, a series of image forming operations is completed.

<Basic Configuration of Fixing Device>

Figure 2:
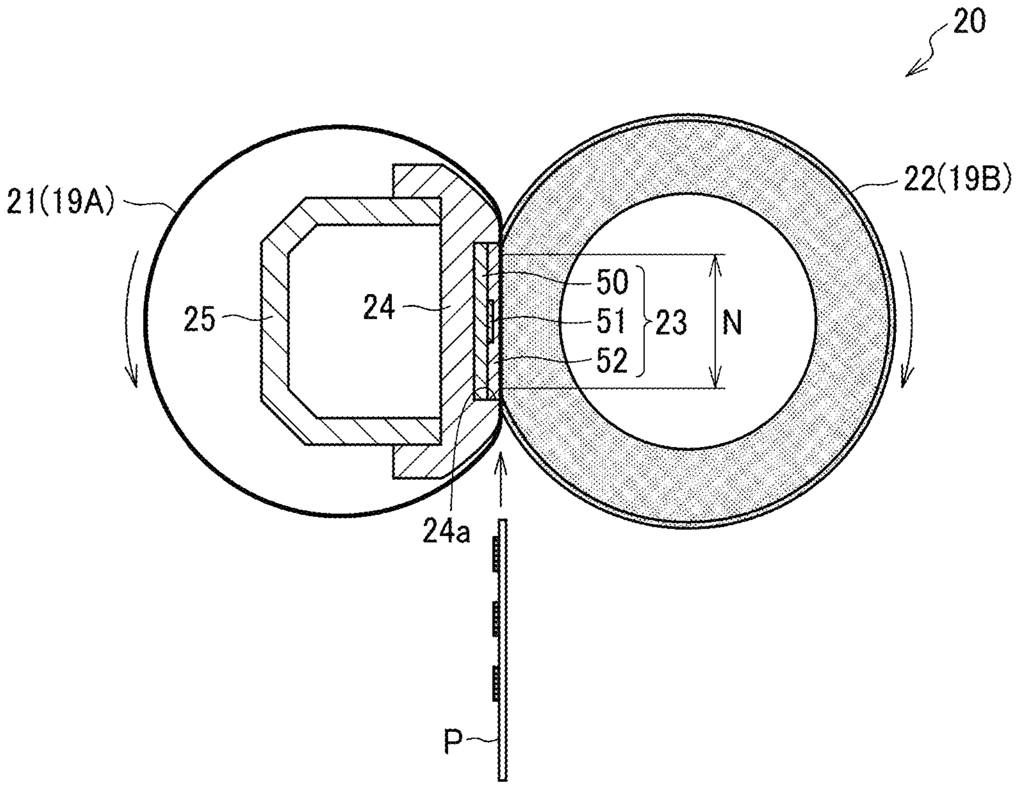
FIG. 2 is a schematic diagram illustrating a basic configuration of a fixing device.

FIG. 2 is a diagram illustrating the basic configuration of the fixing device 20.

As illustrated in FIG. 2, the fixing device 20 includes a heater 23, a heater holder 24, and a stay 25 in addition to the pair of rotators 19A and 19B.

The pair of rotators 19A and 19B includes a first rotator 19A that is a fixing belt 21 disposed to contact an unfixed toner image on a surface of the sheet P. The pair of rotators 19A and 19B includes a second rotator 19B that is a pressure roller 22 disposed to face the fixing belt 21. A pressure member such as a spring presses the fixing belt 21 and the pressure roller 22 to be in contact with each other. As a result, a fixing nip N is formed between the fixing belt 21 and the pressure roller 22.

The fixing belt 21 is an endless belt including a tubular base and a release layer on an outer circumferential surface of the base. The base is made of metal such as nickel or stainless steel or resin such as polyimide. The release layer is made of, for example, tetrafluoroethylene-perfluoroalkylvinylether copolymer (PFA), polytetrafluoroethylene (PTFE), polyimide, polyetherimide, or polyether sulfide (PES). The release layer of the fixing belt 21 facilitates the separation of toner contained in the toner image from the fixing belt 21 and prevents the sheet P from adhering to and wrapping around the fixing belt 21. The fixing belt 21 may include an elastic layer between the base and the release layer. Examples of the material of the elastic layer include rubber such as silicone rubber, silicone rubber foam, and fluororubber. The elastic layer of the fixing belt 21 prevents the fixing belt 21 from forming slight surface asperities, thus facilitating uniform conduction of heat to the toner image on the sheet P to enhance fixing quality.

The pressure roller 22 includes a solid or hollow cored bar, an elastic layer on the outer circumferential surface of the cored bar, and a release layer on the outer circumferential surface of the elastic layer. The cored bar is made of metal such as iron. Examples of the material of the elastic layer include silicone rubber, silicone rubber foam, and fluororubber. The release layer is made of fluororesin such as PFA or PTFE.

The heater 23 heats the fixing belt 21. The heater 23 has a plate shape or a planar shape and contacts the inner circumferential surface of the fixing belt 21. At a position where the fixing belt 21 faces the pressure roller 22, the heater 23 contacts the inner circumferential surface of the fixing belt 21 to form the fixing nip N between the fixing belt 21 and the pressure roller 22. The heater 23 may be in direct contact with the inner circumferential surface of the fixing belt 21 or may be in indirect contact with the inner circumferential surface of the fixing belt 21 via a low-friction slide sheet. In the present specification, unless otherwise specified, the meaning of "contact" includes direct contact and indirect contact. In the direct contact, a first member is in contact with a second member via no member. In the indirect contact, a third member is in contact with a fourth member via a fifth member.

The heater 23 includes a base 50, resistive heat generators 51, and an insulation layer 52.

The resistive heat generators 51 are disposed on the base 50 and are covered with the insulation layer 52. When power is supplied to the resistive heat generators 51, the resistive heat generators 51 generate heat. The heat is transferred to the inner circumferential surface of the fixing belt 21 via the insulation layer 52 to heat the fixing belt 21. Alternatively, the heater 23 may be turned inside out so that the base 50 is in contact with the inner circumferential surface of the fixing belt 21. In this case, since the heat of the resistive heat generators 51 is transmitted to the fixing belt 21 through the base 50, it is preferable that the base 50 be made of a material with high thermal conductivity.

The base 50 is made of material having heat resistance and insulation properties, such as ceramic such as alumina or aluminum nitride, or non-metal material such as glass or mica. Interposing another insulation layer between the base 50 and the resistive heat generators 51 enables using conductive material such as metal as the material of the base 50. Low-cost aluminum or stainless steel is favorable as the metal material of the base 50. To reduce the temperature unevenness of the heater 23 and enhance image quality, the base 50 may be made of material having high thermal conductivity, such as copper, graphite, or graphene. Graphene is formed by bonding of carbon atoms and has a sheet shape.

The resistive heat generators 51 are formed by, for example, screen-printing. The resistive heat generators 51 are produced by, for example, mixing silver-palladium (AgPd) and glass powder into a paste. The paste is coated on the base 50 by screen printing. Subsequently, the base 50 is fired to form the resistive heat generators 51. The material of the resistive heat generator 51 may contain a resistance material, such as silver alloy (e.g., AgPt) or ruthenium oxide ($RuO_2$) in addition to silver-palladium. The insulation layer 52 may be made of, for example, heat-resistant glass.

The heater holder 24 holds the heater 23. The heater holder 24 accommodates the heater 23 in a recess **24*a* to restrict the movement of the heater 23 in the vertical direction in FIG. 2 and the direction orthogonal to the paper surface in which FIG. 2 is drawn. Since the heater holder 24 is heated to a high temperature by heat from the heater 23, the heater holder 24 is preferably made of a heat resistant material. In particular, the heater holder 24 made of heat-resistant resin having low thermal conduction, such as a liquid crystal polymer (LCP), reduces unnecessary heat transfer from the heater 23 to the heater holder 24, thus increasing the heating efficiency of the heater 23**.

The stay 25 supports the heater holder 24. The stay 25 supports a stay side face of the heater holder 24. The stay side face is opposite a nip side face of the heater holder 24. The nip side face faces the pressure roller 22. Accordingly, the stay 25 prevents the heater holder 24 from being bent by a pressing force of the pressure roller 22. As a result, the fixing nip N having a uniform width is formed between the fixing belt 21 and the pressure roller 22. The stay 25 is preferably made of iron-based metal such as steel use stainless (SUS) or steel electrolytic cold commercial (SECC) to enhance the rigidity.

<Operation of Fixing Device>

The fixing device 20 operates as follows.

When the image forming operation starts, a driver starts driving to rotate the pressure roller 22 in a direction indicated by an arrow in FIG. 2, and the rotation of the pressure roller 22 rotates the fixing belt 21. A power source starts supplying power to the heater 23, and the heater 23 generates heat to heat the fixing belt 21. After the temperature of the fixing belt 21 reaches a specified target temperature, the sheet P bearing the unfixed image is conveyed to the fixing nip N between the fixing belt 21 and the pressure roller 22. As a result, the unfixed toner image on the sheet P is heated and pressed to be fixed on the sheet P. The sheet P is ejected from the fixing nip N and conveyed to the sheet ejection section 400.

<Heater Configuration>

Figure 3:
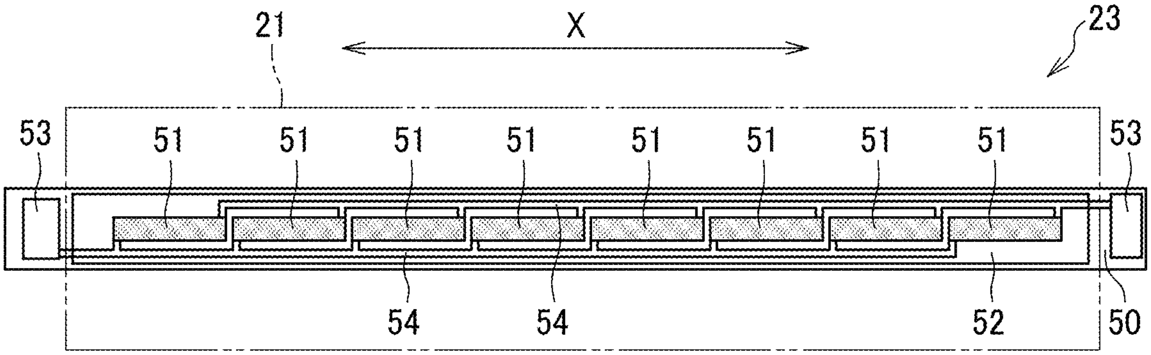
FIG. 3 is a plan view of a heater.

FIG. 3 is a plan view of the heater 23.

As illustrated in FIG. 3, the heater 23 includes a pair of electrodes 53 and multiple power supply lines 54 in addition to the base 50, the resistive heat generators 51, and the insulation layer 52. The base 50 is a longitudinal plate arranged to extend in the longitudinal direction X of the fixing belt 21. The resistive heat generators 51 are arranged at intervals in the longitudinal direction of the base 50 (that is, the direction indicated by the arrow X in FIG. 3). A gap between neighboring resistive heat generators 51 is preferably 0.2 mm or more, more preferably 0.4 mm or more from the viewpoint of maintaining the insulation between the neighboring resistive heat generators 51. In addition, the gap between the resistive heat generators 51 adjacent to each other is preferably 5 mm or less, and is more preferably 1 mm or less, from the viewpoint of reducing temperature unevenness in the longitudinal direction because a too large gap between the resistive heat generators 51 adjacent to each other easily causes a temperature drop in the gap. The pair of electrodes 53 are disposed on both ends of the base 50 in the longitudinal direction. Each electrode 53 is connected to the resistive heat generators 51 via the multiple power supply lines 54. The resistive heat generators 51 are electrically coupled in parallel to the pair of electrodes 53. The arrangement, number, shape of each of the resistive heat generators 51, the electrodes 53, and the power supply lines 54 are not limited to the example illustrated in FIG. 3 and may be appropriately changed.

The power supply lines 54 is covered with the insulation layer 52 in the same manner as the resistive heat generators 51 in order to obtain insulation and durability. However, the insulation layer 52 does not cover the electrodes 53 to expose the electrodes 53 as power supply terminals so as to be connected to the connectors. Connecting the connectors to the electrodes 53 enables the power source (an alternating-current (AC) power source) disposed in the body of the image forming apparatus to supply power to the resistive heat generators 51.

<Temperature Control Mechanism>

Figure 4:
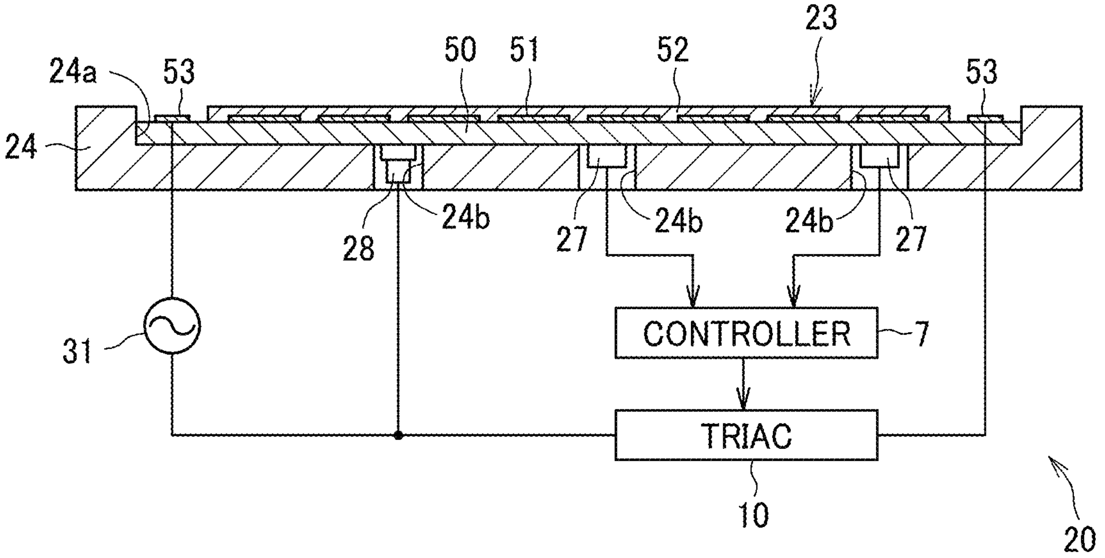
FIG. 4 is a diagram illustrating a configuration of a temperature control mechanism of the heater.

FIG. 4 is a diagram illustrating a configuration of a temperature control mechanism of the heater 23.

As illustrated in FIG. 4, the temperature control mechanism in the fixing device 20 includes thermistors 27, a thermostat 28, a triac 10, and a controller 7 to control temperatures of the heater 23.

The thermistor 27 is a temperature sensor to control the temperature of the heater 23 and maintain the temperature of the heater 23 at a predetermined temperature. The thermostat 28 is the temperature sensor to prevent an excessive temperature rise of the heater 23, unlike the thermistor 27. The thermistors 27 and the thermostat 28 are disposed so as to be in contact with the back face of the heater 23 through through holes **24*b* of the heater holder 24. The back face of the heater 23 is opposite to a face of the heater 23 that is the face in contact with the fixing belt 21. The thermistors 27 and the thermostat 28 may be in direct contact with the heater 23 or may be in indirect contact with the heater 23** via a high thermal conductor.

The triac 10 serves as an energization controller that controls a turn-on duty supplied from an AC power source 31 to the heater 23 based on control signals from the controller 7. The turn-on duty is defined as a ratio of a power-on time per a control cycle. The controller 7 includes a microcomputer including, for example, a central processing unit (CPU), a read-only memory (ROM), a random-access memory (RAM), and an input and output (I/O) interface. The controller 7 outputs the control signal to control the triac 10 based on the temperature detected by the thermistor 27, and the triac 10 controls the turn-on duty based on the control signal. As a result, the temperature of the heater 23 is maintained at a predetermined target temperature. When the thermostat 28 detects an abnormal temperature rise in the heater 23, the thermostat 28 operates to cut off the power supply to the heater 23.

In the example of FIG. 4, the thermistors 27 are disposed at the center and one end of the heater 23 in the longitudinal direction, and the thermostat 28 is disposed at the other end of the heater 23 with respect to the center in the longitudinal direction, but the position and number of the thermistors 27 and the thermostat 28 are not limited to the example of FIG. 4 and may be appropriately changed.

<Issue with Assembly of Components>

The following describes an issue regarding the assembly of components based on a configuration of a comparative example different from the present disclosure.

Figure 20:
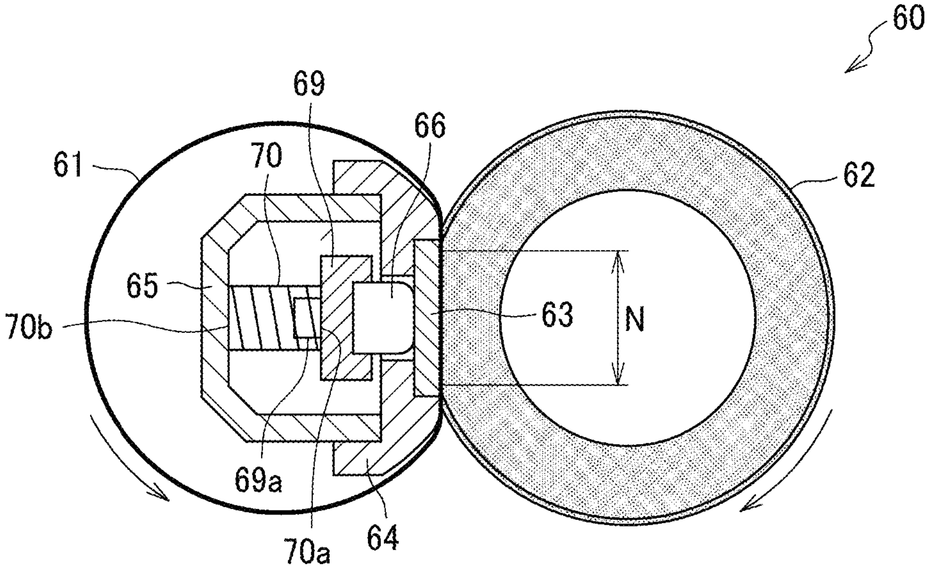
FIG. 20 is a diagram illustrating a configuration of the fixing device according to a comparative example.

FIG. 20 is a diagram illustrating the configuration of a fixing device 60 according to the comparative example.

The fixing device 60 according to the comparative example includes a fixing belt 61, a pressure roller 62, a heater 63, a heater holder 64, a stay 65, and a temperature sensor 66. These members of the fixing device 60 have the same basic configurations and functions as those of the fixing device 20 described above, and thus the description of the configurations and functions of these members is omitted. The temperature sensor 66 means one of thermistors or a thermostat to detect the temperature of the heater 63.

The fixing device 60 includes a sensor holder 69 as a temperature sensor holder to hold the temperature sensor 66. Additionally, the fixing device 60 includes a metal coil spring 70 as a biasing member and an elastic body disposed to be compressed between the sensor holder 69 and the stay 65. The compressed coil spring 70 biases the temperature sensor 66 toward the heater 63. In other words, the compressed coil spring 70 presses the temperature sensor 66 against the heater 63 in a pressing direction. As a result, the temperature sensor 66 is held to be pressed against the heater 63.

Figure 21:
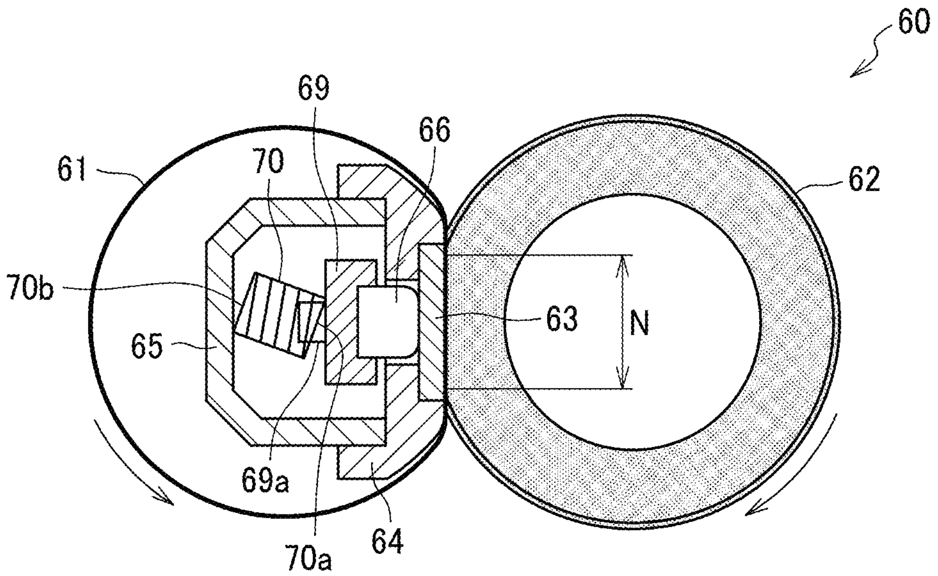
FIG. 21 is a diagram of the fixing device of FIG. 20 to illustrate the coil spring inclined.

The sensor holder 69 includes a projection **69*a* into which one end 70*a* of the coil spring 70 is fitted. Fitting the one end 70*a* of the coil spring 70 into the projection 69*a* of the sensor holder 69 positions the one end 70*a* of the coil spring 70 with respect to the sensor holder 69. On the other hand, the other end 70*b* of the coil spring 70 simply contacts the inner face of the stay 65. In the above-described configuration, the other end 70*b* of the coil spring 70 is likely to displace with respect to the stay 65 if an assembly error occurs when the coil spring 70 is assembled. If the coil spring 70 is inclined with respect to the temperature sensors 66 due to the displacement of the other end 70*b* of the coil spring 70 as illustrated in FIG. 21, the coil spring 70 cannot exert a predetermined biasing force, and hence the temperature sensor 66 cannot be pressed against the heater 63** at a target pressure.

In order to prevent the occurrence of the above-described assembly failure, it is necessary to check whether the coil spring 70 is correctly assembled after the coil spring 70 is assembled. However, the fixing device 60 in the comparative example has the issue that confirming the assembled state of the coil spring 70 from the outside of the stay 65 is difficult because the stay 65 is disposed so as to cover the periphery of the coil spring 70. If the fixing device in the image forming apparatus includes the coil spring 70 that is not assembled correctly or not include the coil spring 70 (a missing part), the temperature detection function of the temperature sensor 66 is not properly exhibited, and the excessive temperature rise is likely to occur in the fixing device.

In view of the above, an object of embodiments of the present disclosure is to provide the fixing device that enables easy checking the assembled state of the biasing member that biases the temperature sensor. To countermeasure the above-described issue, the present disclosure proposes fixing devices according to the following embodiments. The following describes a first embodiment according to the present disclosure.

First Embodiment

Figure 5:
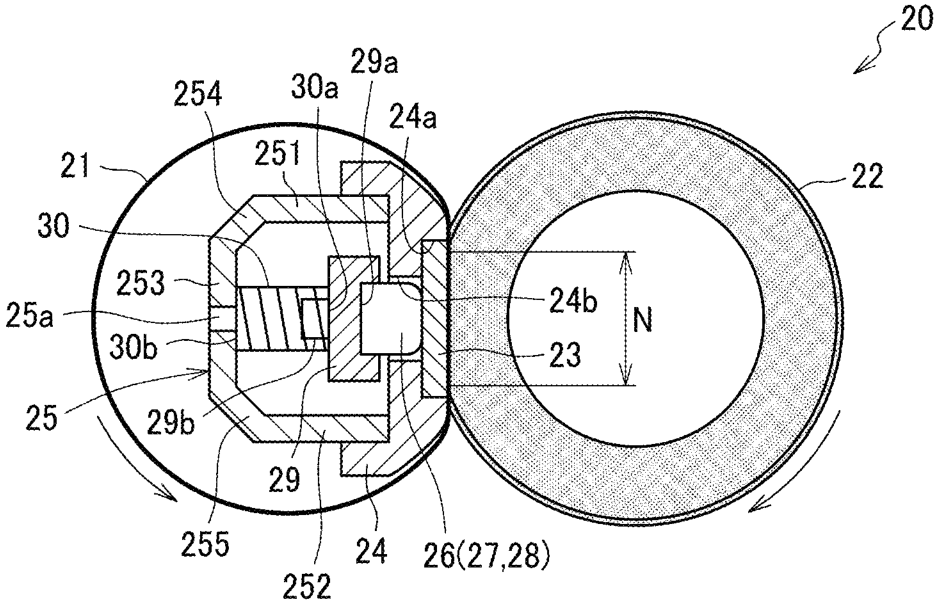
FIG. 5 is a diagram illustrating a configuration of the fixing device according to a first embodiment to illustrate the feature of the first embodiment.

FIG. 5 is a diagram illustrating the configuration of the fixing device 20 according to the first embodiment to illustrate the feature of the first embodiment.

With reference to FIG. 5, a structure to hold the temperature sensor 26 is described.

The fixing device 20 according to the first embodiment of the present disclosure includes a sensor holder 29 as the temperature sensor holder and a metal coil spring 30 as the biasing member and the elastic body, as in the fixing device 60 according to the comparative example. The temperature sensor 26 may be the thermistor 27 or the thermostat 28.

The sensor holder 29 has a holding portion **29*a* having a recessed shape to hold the temperature sensor 26. The temperature sensor 26 is fitted into the holding portion 29*a* of the sensor holder 29 to hold the temperature sensor 26 in the sensor holder 29. The coil spring 30 is disposed to be compressed between the sensor holder 29 and the stay 25. The compressed coil spring 30 biases the temperature sensor 26 toward the heater 23. In other words, the compressed coil spring 30 presses the temperature sensor 26 against the heater 23 in the pressing direction. As a result, the temperature sensor 26 is held to be pressed against the heater 23. In FIG. 5, the cross-sectional shape of the heater 23** is simplified.

The coil spring 30 as the elastic body extends from one end **30*a* to the other end 30*b* in the longitudinal direction of the coil spring 30 that is the pressing direction of the coil spring 30. The one end 30*a* is closer to the temperature sensor 26 than the other end 30*b*. The sensor holder 29 includes a projection 29*b* into which the one end 30*a* of the coil spring 30 is fitted. Fitting the one end 30*a* of the coil spring 30 into the projection 29*b* of the sensor holder 29 positions the one end 30*a* of the coil spring 30 with respect to the sensor holder 29. On the other hand, since the other end 30*b* of the coil spring 30 simply contacts the inner face of the stay 25, the other end 30*b* of the coil spring 30 is not positioned with respect to the stay 25. Since the inner face of the stay 25 functioning as a receiver to receive the other end 30*b* of the coil spring 30 is a flat face having no projection, the other end 30*b* of the coil spring 30 is held so as to be displaceable along the inner face of the stay 25. As a result, as in the comparative example, the other end 30*b* of the coil spring 30** is easily displaced.

In the first embodiment, the stay 25 covers the coil spring 30 so as not to expose the coil spring 30 to the outside of the stay 25, as in the comparative example. In other words, the stay 25 covers the coil spring 30 to conceal the coil spring 30 from the outside of the stay 25. Therefore, it is difficult to see the entire coil spring 30 from the outside of the stay 25. The coil spring 30 being "not exposed" to the outside of the stay 25 means that the coil spring 30 does not protrude to the outside from the outer face of the stay 25. Specifically, the stay 25 in the first embodiment includes a first wall 251, a second wall 252, a third wall 253, and two bent portions 254 and 255. The first wall 251 and the second wall 252 extend from the heater holder 24 toward a direction away from the pressure roller 22. The third wall 253 extends in a direction orthogonal to or intersecting the first wall 251 and the second wall 252. The bent portion 254 connects the first wall 251 to the third wall 253. The bent portion 255 connects the second wall 252 to the third wall 253. In other words, the stay 25 includes the third wall 253, the two bent portions 254 and 255 disposed at both ends of the third wall 253, the first wall 251 extending from the bent portion 254 toward the pressure roller 22, and the second wall 252 extending from the bent portion 255 toward the pressure roller 22. As illustrated in FIG. 5, when the fixing device 20 is viewed from one end in the longitudinal direction of the fixing belt 21, the first wall 251 and the second wall 252 are disposed to face each other and interpose the coil spring 30 between the first wall 251 and the second wall 252, and the third wall 253 is disposed to face the heater holder 24 and interpose the coil spring 30 between the third wall 253 and the heater holder 24. As a result, the stay 25 covers both sides of the coil spring 30 in the vertical direction in FIG. 5 and the left end of the coil spring 30 in the lateral direction in FIG. 5. Since the stay 25 is a long member continuously extending in the longitudinal direction of the fixing belt, it is difficult to visually observe the whole of the coil spring 30 from the outside of the stay 25 after the stay 25 is assembled so as to cover the coil spring 30.

To countermeasure the above-described issue, the stay 25 in the first embodiment has holes 25*a* so that the coil spring 30 can be easily viewed. The holes 25*a* are in the third wall 253 of the stay 25 that receives the other end 30*b* of the coil spring 30. The holes 25*a* communicate the inside and the outside of the stay 25. In other words, the holes 25*a* penetrates through the stay 25 as the receiver.

The stay 25 in the first embodiment does not cover both ends of the coil spring 30 in the longitudinal direction of the stay 25 that is the direction orthogonal to the surface of the paper on which FIG. 5 is drawn. As described above, the stay 25 does not cover the one end of the coil spring facing the heater holder 24 and, in addition, may not cover a part of the entire periphery of the coil spring 30. In other words, the stay 25 may cover at least both sides of the coil spring 30 in the vertical direction intersecting the longitudinal direction of the stay 25 and the left end of the coil spring 30 in the lateral direction intersecting the longitudinal direction of the stay 25 in FIG. 5.

Figure 6:
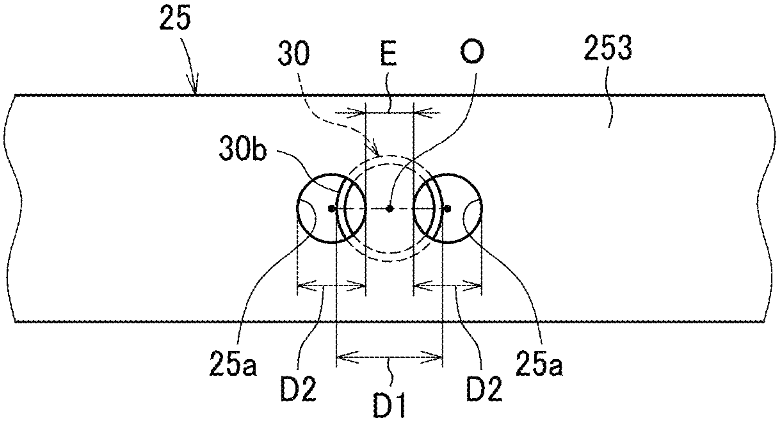
FIG. 6 is a side view of a part of a stay according to the first embodiment viewed from the outside of the stay to illustrate holes of the stay.

FIG. 6 is a side view of a part of the stay 25 according to the first embodiment viewed from the outside of the stay 25 to illustrate the holes 25*a* of the stay 25.

As illustrated in FIG. 6, the stay 25 in the first embodiment has two holes 25*a*. Each hole 25*a* is at a position facing a part of the other end 30*b* of the coil spring 30. The "position facing the part of the other end 30*b* of the coil spring 30" means the position facing the part of the other end 30*b* of the coil spring 30 that is correctly assembled. The coil spring 30 that is correctly assembled in the first embodiment is, for example, orthogonal to the third wall 253 and has one end 30*a* fitted into the projection 29*b* of the sensor holder 29. The position of the other end 30*b* of the coil spring 30 that is correctly assembled is not limited to one ideal position but may include multiple positions in consideration of allowable positional deviation.

Since the stay 25 in the first embodiment has the hole 25*a* at the position facing the part of the other end 30*b* of the coil spring 30 on a contact face (the third wall 253) contacting the other end 30*b* of the coil spring 30 as described above, a worker can easily confirm whether the coil spring 30 is correctly assembled through the hole 25*a*. In other words, since the hole 25*a* is at a position close to the other end 30*b* of the coil spring 30 and not at a position away from the other end 30*b* of the coil spring 30, the worker can easily and visually observe the other end 30*b* of the coil spring 30 through the hole 25*a*.

For example, the worker can visually observe the other end 30*b* of the coil spring 30 that is correctly assembled through the two holes 25*a* as illustrated in FIG. 6.

In particular, the two holes 25*a* in the first embodiment are arranged symmetrically with respect to the center O of the other end 30*b* of the coil spring 30 assembled at a correct position. As a result, the coil spring 30 assembled at the correct position is visually observed to the same extent in the two holes 25*a*. In each hole 25*a*, the coil spring 30 is not shifted in the vertical direction or the horizontal direction in FIG. 6.

Figure 7:
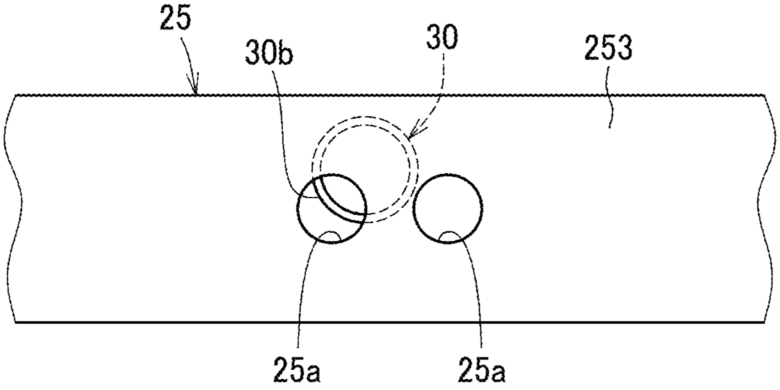
FIG. 7 is a side view of the part of the stay of FIG. 6 to illustrate a coil spring displaced from a correct position.

On the other hand, the other end 30*b* of the coil spring 30 that is assembled at a position deviated from the correct position is observed, for example, in an upper part of one hole 25*a* and not observed in the other hole 25*a* as illustrated in FIG. 7. The worker can estimate the direction and degree of the positional deviation of the coil spring 30 based on observation results of the other end 30*b* of the coil spring 30 in the holes 25*a*. Thus, the worker can check the direction and the degree of inclination of the coil spring 30 and determine whether the posture of the coil spring 30 is good or bad. In addition, when the coil spring 30 is not assembled in the fixing device (in the case of a missing part), the worker cannot visually observe the other end 30*b* of the coil spring 30 in any hole 25*a*. As a result, the worker can confirm whether the coil spring 30 is assembled or not.

As described above, the fixing device according to the first embodiment includes the receiver such as the stay 25 receiving the other end 30*b* of the coil spring 30 and having the holes 25*a* to visually observe the other end 30*b* of the coil spring 30. As a result, the worker can easily check an assembled state of the coil spring 30 that includes the presence or absence of the coil spring 30 through the hole 25*a*. Thus, the occurrence of the assembly failure of the coil spring 30 can be reduced, and the reliability is enhanced.

The shape of the hole 25*a* is not limited to a circle as illustrated in FIG. 6 and may be an elliptical shape, a polygonal shape such as a quadrangular shape, or other shapes.

The width D2 of each of the holes 25*a* illustrated in FIG. 6 is preferably smaller than the width D1 of the other end 30*b* of the coil spring 30. In the above, the width D1 of the other end 30*b* of the coil spring 30 means the outer diameter of the other end 30*b* of the coil spring 30, and the width D2 of the hole 25*a* means the inner diameter of the hole 25*a*. Designing the width D2 of each of the holes 25*a* to be smaller than the width D1 of the other end 30*b* of the coil spring 30 as described above enables preventing the coil spring 30 from coming off or falling off from the hole 25*a*. The hole 25*a* may have a shape other than the circle, and an end of the biasing member may have a shape other than the annular shape of the coil spring 30. A shape having some widths may be considered. In such a case, the smallest width of the hole 25*a* is preferably smaller than the largest width of the end of the biasing member.

As illustrated in FIG. 6, the distance E between neighboring holes 25*a* is preferably smaller than the width D1 of the other end 30*b* of the coil springs 30. Setting the distance E as described above enables the worker to visually observe, through the holes 25*a*, the other end 30*b* of the coil spring 30 that is assembled at the correct position (between the two holes 25*a*). The distance E described above means the shortest distance between the holes 25*a*. When the biasing member has an end having a shape other than the annular shape of the coil spring 30 and when it is considered that the shape has multiple widths, the preferable distance E is smaller than the smallest width of the end of the biasing member.

Figure 8:
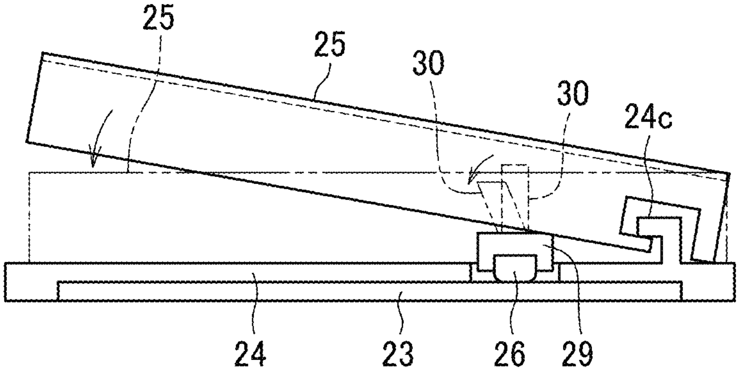
FIG. 8 is a schematic diagram illustrating an example of the stay rotated about an engaging portion of a heater holder to assemble the stay to the heater holder.

As illustrated in FIG. 6, the holes 25*a* arranged in the longitudinal direction of the stay 25 that is the lateral direction in FIG. 6 particularly enables the worker to easily recognize the positional deviation of the coil spring 30 in the longitudinal direction of the stay 25. For example, rotating the stay 25 about an engaging portion 24*c* of the heater holder 24 to assemble the stay 25 to the heater holder 24 as illustrated in FIG. 8 is likely to cause the coil spring 30 to be inclined in the longitudinal direction of the stay 25 in accordance with the rotation of the stay 25 (see a two-dot chain line in FIG. 8). Accordingly, it is preferable that the configuration illustrated in FIG. 8 is configured as illustrated in FIG. 6. Arranging the holes 25*a* so as to be aligned in the longitudinal direction of the stay 25 enables easily checking the inclination of the coil spring 30 in the longitudinal direction of the stay 25.

From the viewpoint of enhancing the dimensional accuracy of the hole 25*a*, the face of the stay 25 that receives the other end 30*b* of the coil spring 30 is preferably flat. The face of the stay 25 that receives the other end 30*b* of the coil spring 30 may be a face other than the flat face, such as a face having irregularities, but is preferably the flat face because the hole 25*a* can be processed with high accuracy. As a method of processing the hole 25*a*, a cutting method using a drill may be adopted.

Figure 9:
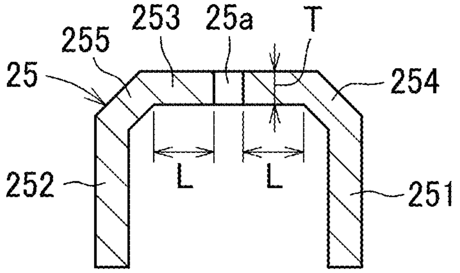
FIG. 9 is a sectional view of the stay in the first embodiment to illustrate a distance from a bent portion of the stay to the hole.

With reference to FIG. 9, the thickness T of the stay 25 and the distance L between the hole 25*a* and each of the bent portions 254 and 255 of the stay 25 preferably satisfy the relationship expressed by the following expression (1).

$$L>(1/2)\times T. \qquad \text{Expression (1)}$$

When a metal plate is bent to make the stay 25, too small distance L between the hole 25*a* and each of the bent portions 254 and 255 causes deformation of the hole 25*a*. As a result, forming the hole 25*a* with high accuracy is difficult. Specifically, after the hole 25*a* is formed in the metal plate, the metal plate is bent. Too small a distance L easily causes the deformation of the hole 25*a* by the bending process. As a result, the high dimensional accuracy of the hole 25*a* cannot be obtained. The distance L satisfying the relationship expressed by the above expression (1) is large enough to form the hole 25*a* with high accuracy.

The biasing member may be an elastic body such as a rubber member, in addition to the metal coil spring 30. Even if the biasing member is the elastic body such as the rubber member, the above-described configuration enables visually observing an end of the elastic body through the hole 25*a* to easily confirm the assembled state of the elastic body.

Other embodiments are described below. Differences from the above-described first embodiment are described, and descriptions of the same portions are appropriately omitted.

Second Embodiment

Figure 10:
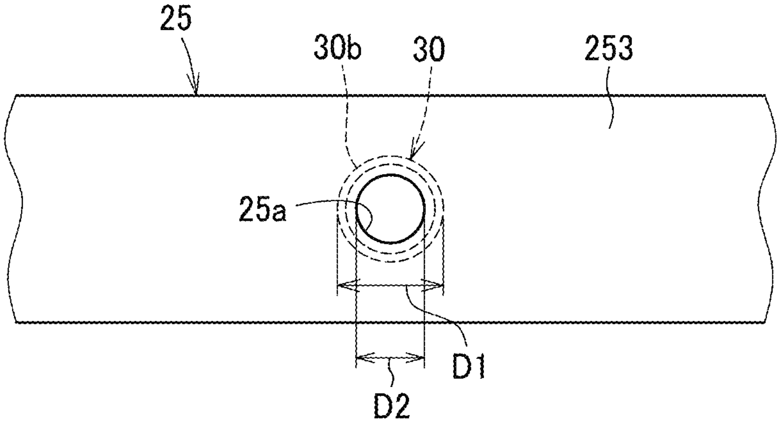
FIG. 10 is a side view of a part of the stay according to a second embodiment viewed from the outside of the stay to illustrate the hole of the stay.

FIG. 10 is a side view of a part of the stay 25 according to the second embodiment viewed from the outside of the stay 25 to illustrate the hole 25*a* of the stay 25.

As illustrated in FIG. 10, the stay 25 may have one hole 25*a*. In this case, the inner diameter (the width D2) of the circular hole 25*a* is designed to be smaller than the outer diameter (the width D1) of the coil spring 30 so that the coil spring 30 does not come out or fall off from the hole 25*a*. In other words, one circular hole 25*a* is formed inside the inner diameter of the other end 30*b* of the coil spring 30 on the contact face of the stay 25 that contacts the other end 30*b* of the coil spring 30. The other end 30*b* of the coil spring 30 may have a shape other than a circle. In this case, the hole 25*a* is designed to be inside a region in which the other end 30*b* of the coil spring 30 as the elastic body contacts the contact face.

The other end 30*b* of the coil spring 30 assembled at the correct position is positioned outside the outer diameter of the one hole 25*a* as illustrated in FIG. 10. As a result, the other end 30*b* of the coil spring 30 at the correct position cannot be visually observed. On the other hand, since the other end 30*b* of the coil spring 30 that is assembled at the position deviated from the correct position overlaps the hole 25*a*, the worker can visually observe the other end 30*b* of the coil spring 30 through the holes 25*a*. Accordingly, the fixing device according to the second embodiment enables the worker to visually observe the state of the displacement of the coil spring 30 displaced. In other words, the worker can easily confirm the assembled state of the coil spring 30 assembled at the position deviated from the correct position.

In the second embodiment, the worker cannot visually observe the other end 30*b* of the coil spring 30 assembled at the correct position but can visually observe a portion other than the other end 30*b* of the coil spring 30 through the hole 25*a*. As a result, the worker can confirm whether the coil spring 30 is inside the stay 25. However, since confirming whether the coil spring 30 is inside the stay 25 in the second embodiment is more difficult than that in the first embodiment that enables the worker to visually observe the other end of the coil spring 30, the worker may confirm whether the coil spring 30 is inside the stay 25 using another method. For example, the worker may check the repulsive force of the temperature sensor 26 after the stay 25 is assembled to the heater holder 24.

Third Embodiment

Figure 11:
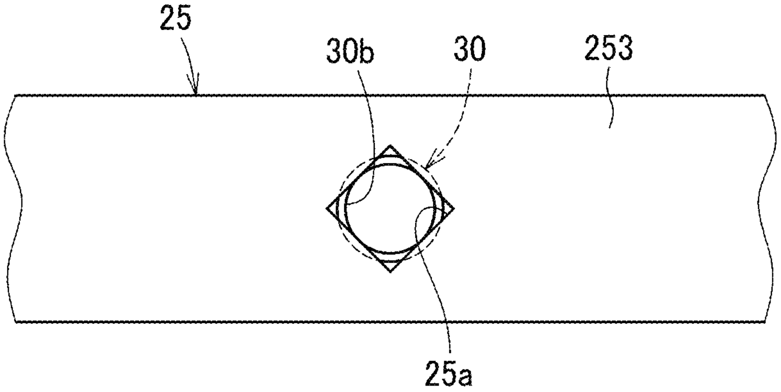
FIG. 11 is a side view of a part of the stay according to a third embodiment viewed from the outside of the stay to illustrate the hole of the stay.

FIG. 11 is a side view of a part of the stay 25 according to the third embodiment viewed from the outside of the stay 25 to illustrate the hole 25*a* of the stay 25.

As illustrated in FIG. 11, the shape of the hole 25*a* in the stay 25 according to the third embodiment is a rectangle such as a square or a rhombus. Forming the hole 25*a* to be the rectangle as described above, even if there is only one hole 25*a*, enables the worker to visually observe the other end 30*b* of the coil spring 30 assembled at the correct position through the hole 25*a* and enables preventing the coil spring 30 from coming out from the hole 25*a*. As a result, the configuration according to the third embodiment can check the quality of the assembled state of the coil spring 30 more accurately than the configuration illustrated in FIG. 10 including the stay 25 having one circular hole 25*a*.

Fourth Embodiment

Figure 12:
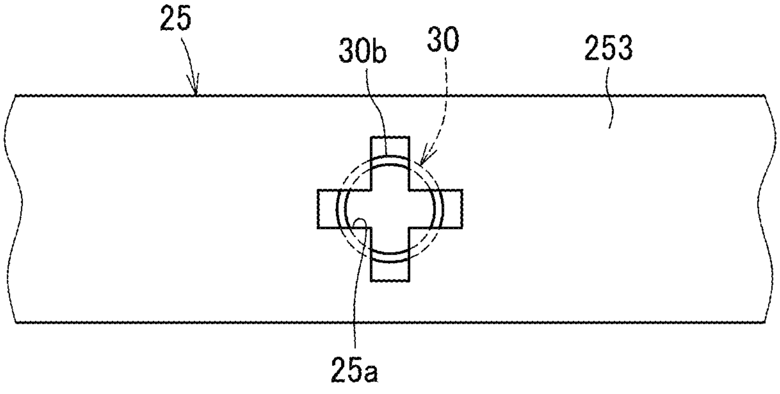
FIG. 12 is a side view of a part of the stay according to a fourth embodiment viewed from the outside of the stay to illustrate the hole of the stay.

FIG. 12 is a side view of a part of the stay 25 according to the fourth embodiment viewed from the outside of the stay 25 to illustrate the hole 25*a* of the stay 25.

As illustrated in FIG. 12, the shape of the hole 25*a* may be a cross shape. In this case, the stay 25 has one hole 25*a*, but forming the hole 25*a* to be the cross shape enables the worker to visually observe the other end 30*b* of the coil spring 30 assembled at the correct position through the hole 25*a* and enables preventing the coil spring 30 from coming out from the hole 25*a*.

Fifth Embodiment

Figure 13:
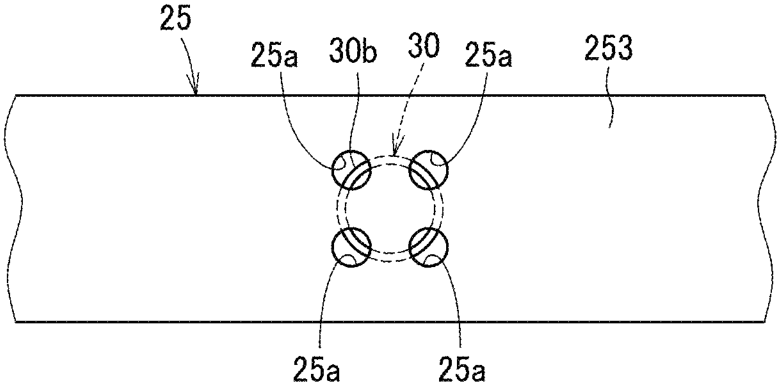
FIG. 13 is a side view of a part of the stay according to a fifth embodiment viewed from the outside of the stay to illustrate the holes of the stay.

FIG. 13 is a side view of a part of the stay 25 according to the fifth embodiment viewed from the outside of the stay 25 to illustrate the holes 25*a* of the stay 25.

As illustrated in FIG. 13, the stay 25 may have two or more holes 25*a*. In this case, four holes 25*a* are positioned at the vertices of the square, respectively. The stay 25 may have three or five or more holes 25*a*, and the shape of the hole 25*a* may be a shape other than a circle.

Sixth Embodiment

Figure 14:
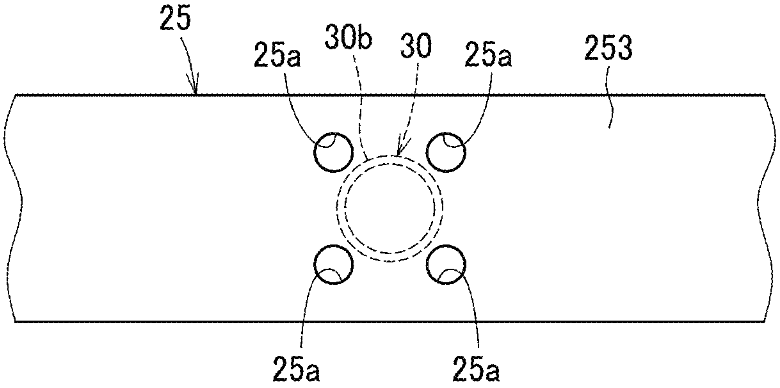
FIG. 14 is a side view of a part of the stay according to a sixth embodiment viewed from the outside of the stay to illustrate the holes of the stay.

FIG. 14 is a side view of a part of the stay 25 according to the sixth embodiment viewed from the outside of the stay 25 to illustrate the holes 25*a* of the stay 25.

In the sixth embodiment illustrated in FIG. 14, multiple holes 25*a* are outside the outer diameter of the other end 30*b* of the coil spring 30 assembled at the correct position. In this case, the other end 30*b* of the coil spring 30 assembled at the correct position does not overlap the multiple holes 25*a*. Accordingly, the worker cannot visually observe the other end 30*b* of the coil spring 30 through any one of holes 25*a*. On the other hand, since the other end 30*b* of the coil spring 30 that is assembled at the position deviated from the correct position overlaps the hole 25*a*, the worker can visually observe the other end 30*b* of the coil spring 30 through the holes 25*a*.

Accordingly, the fixing device according to the sixth embodiment enables the worker to visually observe the state of the displacement of the coil spring 30.

In this case, as in the second embodiment illustrated in FIG. 10, the worker cannot visually observe the other end 30*b* of the coil spring 30 assembled at the correct position but can visually observe a portion other than the other end 30*b* of the coil spring 30 through the hole 25*a*. As a result, the worker can confirm whether the coil spring 30 is inside the stay 25.

As described above, the stay 25 as the receiver receiving the other end 30*b* of the coil spring 30 in the first to sixth embodiments has the hole 25*a* communicating the inside and the outside of the stay 25, which enables the worker to visually observe the coil spring 30 through the hole 25*a*. The phrase "enables to visually observe the coil spring 30" in this specification means that the worker can visually observe not only the other end 30*b* of the coil spring 30 assembled at the correct position but also another part of the coil spring 30 assembled at the correct position other than the other end 30*b*. The above-described hole 25*a* at a position that enables the worker to visually observe the coil spring 30 enables the worker to check the position of the coil spring 30 in the longitudinal direction of the stay 25 (the horizontal direction in FIG. 6) and the short-side direction of the stay 25 (the vertical direction in FIG. 6).

Even if the hole 25*a* is in a face other than the contact face of the stay 25 that is in contact with the other end 30*b* of the coil spring 30, the worker can visually observe the coil spring 30 from the outside of the stay 25 through the hole 25*a*. For example, even when the stay 25 has the hole 25*a* in the first wall 251, the second wall 252, or the bent portion 254 or 255 in FIG. 5, the worker can visually observe the coil spring 30 through the hole 25*a*. However, the above-described configuration has an issue that the worker cannot recognize the positional deviation of the coil spring 30 shifted in the vertical direction in FIG. 5 because the worker sees the coil spring 30 in the vertical direction in FIG. 5.

In contrast, in the first to sixth embodiments, the hole 25*a* is not in the first wall 251, the second wall 252, and the bent portions 254 and 255. The worker can find the coil spring 30 shifted in the vertical direction in FIG. 5 through the hole 25*a* in the third wall 253 having the contact face contacting the other end 30*b* of the coil spring 30. In other words, since the hole 25*a* is in the third wall 253 having the contact face in the first to sixth embodiments, the worker can visually check the displacement of the other end 30*b* of the coil spring 30 on the contact face in the longitudinal direction and the short-side direction of the stay 25 through the hole 25*a*. The longitudinal direction of the stay 25 is the lateral direction in FIGS. 6, 7, 10 to 14. The short-side direction is a direction intersecting the longitudinal direction and the vertical direction in FIGS. 6, 7, 10 to 14. As a result, according to each of the embodiments, the worker can accurately check the positional deviation of the coil spring 30.

Seventh Embodiment

Figure 15:
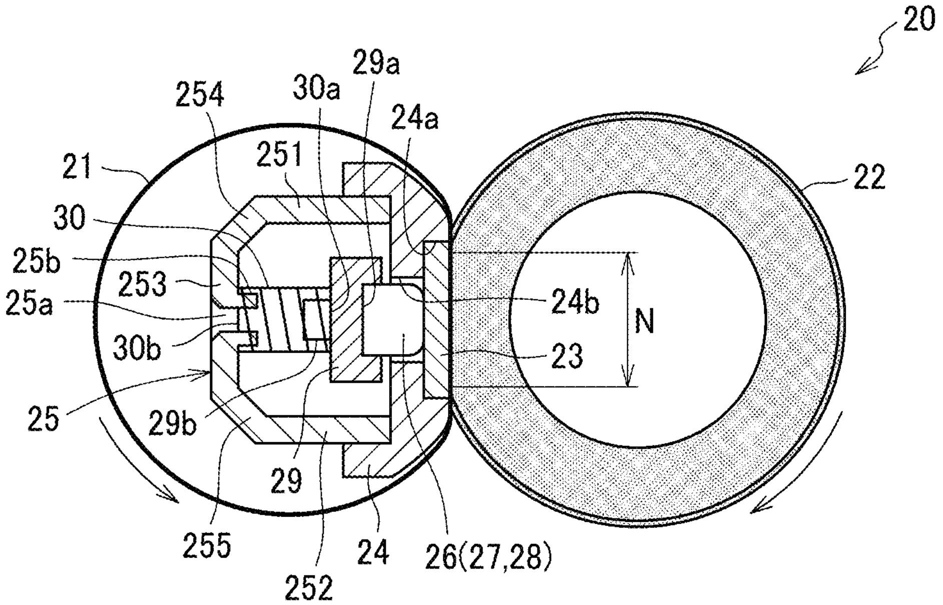
FIG. 15 is a schematic diagram illustrating a configuration of the fixing device according to a seventh embodiment.

FIG. 15 is a schematic diagram illustrating a configuration of the fixing device 20 according to a seventh embodiment.

As illustrated in FIG. 15, the fixing device 20 in the seventh embodiment includes a protrusion 25*b* protruding from the edge of the hole 25*a* toward the inside of the stay 25 (toward the coil spring 30). For example, using a cutting tool such as a drill and moving the cutting tool from the outside of the stay 25 toward the inside of the stay 25 to form the hole 25*a* generates burrs protruding inward at the edge of the hole 25*a*. Such a burr may be used as the protrusion 25*b*. As illustrated in FIG. 15, the coil spring 30 can be positioned by inserting the protrusion 25*b* into the other end 30*b* of the coil spring 30 and mounting the other end 30*b* of the coil spring 30 on the protrusion 25*b*.

Eighth Embodiment

Figure 16:
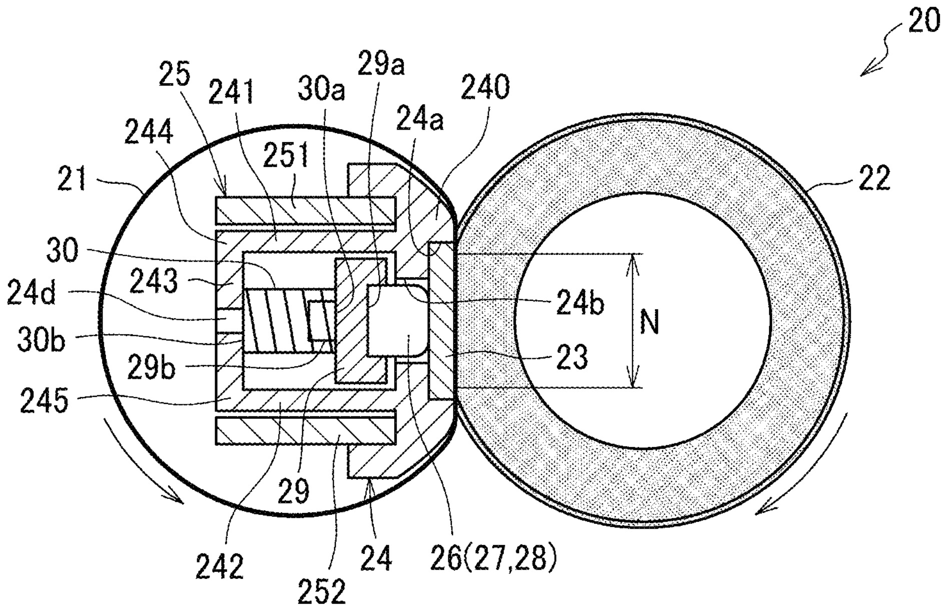
FIG. 16 is a schematic diagram illustrating a configuration of the fixing device according to an eighth embodiment.

FIG. 16 is a schematic diagram illustrating a configuration of the fixing device 20 according to an eighth embodiment.

In the eighth embodiment illustrated in FIG. 16, the coil spring 30 is supported by a part of the heater holder 24, not by the stay 25. Instead of the stay 25, the heater holder 24 functions as the receiver receiving the other end 30*b* of the coil spring 30 in the eighth embodiment.

In this case, the heater holder 24 covers the coil spring 30. Specifically, the heater holder 24 includes a base 240, a first wall 241, a second wall 242, a third wall 243, and two bent portions 244 and 245. The base 240 holds the heater 23. The first wall 241 and the second wall 242 extend from the base 240 toward a direction away from the pressure roller 22. The third wall 243 extends in a direction orthogonal to or intersecting the first wall 241 and the second wall 242. The bent portion 244 connects the first wall 241 to the third wall 243. The bent portion 245 connects the second wall 242 to the third wall 243.

As illustrated in FIG. 16, when the fixing device 20 is viewed from one end in the longitudinal direction of the fixing belt 21, the first wall 241 and the second wall 242 of the heater holder 24 are disposed to face each other and interpose the coil spring 30 between the first wall 241 and the second wall 242, and the third wall 243 is disposed to face the base 240 and interpose the coil spring 30 between the third wall 243 and the base 240. As a result, the heater holder 24 covers both sides of the coil spring 30 in the vertical direction in FIG. 16 and both sides of the coil spring 30 in the lateral direction in FIG. 16. In this state, the coil spring 30 is disposed so as not to be exposed to the outside of the heater holder 24.

In the eighth embodiment, the heater holder 24 has a hole 24*d* to visually observe the other end 30*b* of the coil spring 30. The hole 24*d* is at a position facing the other end 30*b* of the coil spring 30 on a contact face of the heater holder 24 that contacts the other end 30*b* of the coil spring 30. As a result, the worker can visually observe the other end 30*b* of the coil spring 30 through the hole 24*d* and easily check the assembled state of the coil spring 30. The hole 24*d* in the heater holder 24 may be the configured as described in any one of the embodiments illustrated in FIGS. 6, 7, and 10 to 14.

Figure 17:
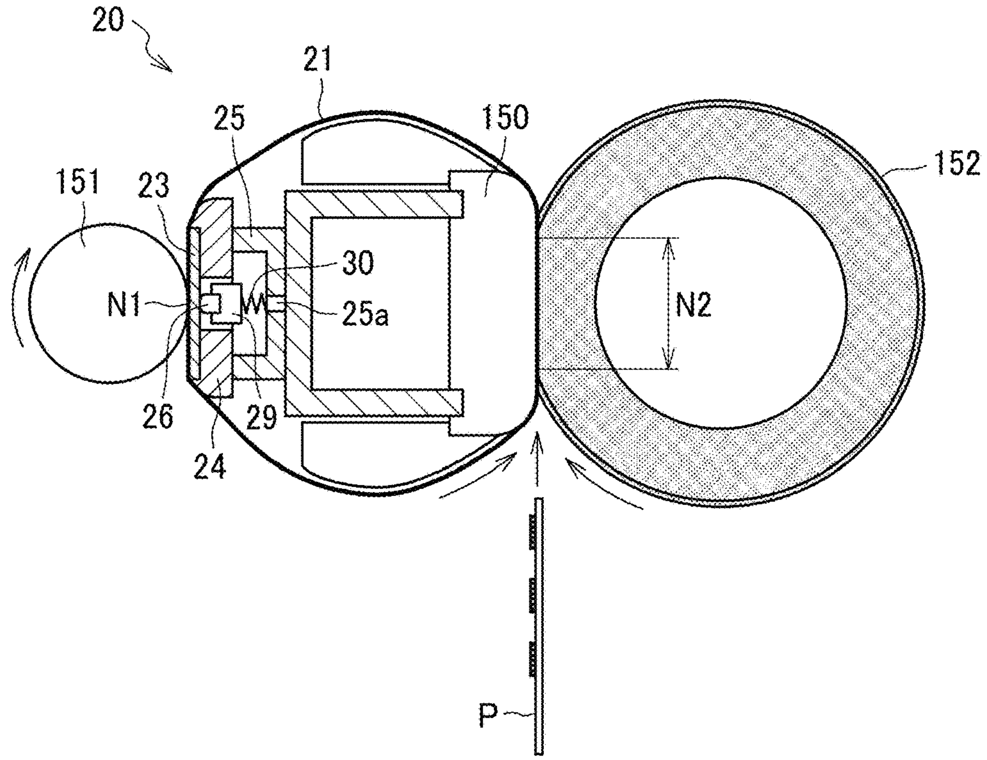
FIG. 17 is a schematic diagram of another fixing device in which the above embodiments are applicable.
Figure 18:
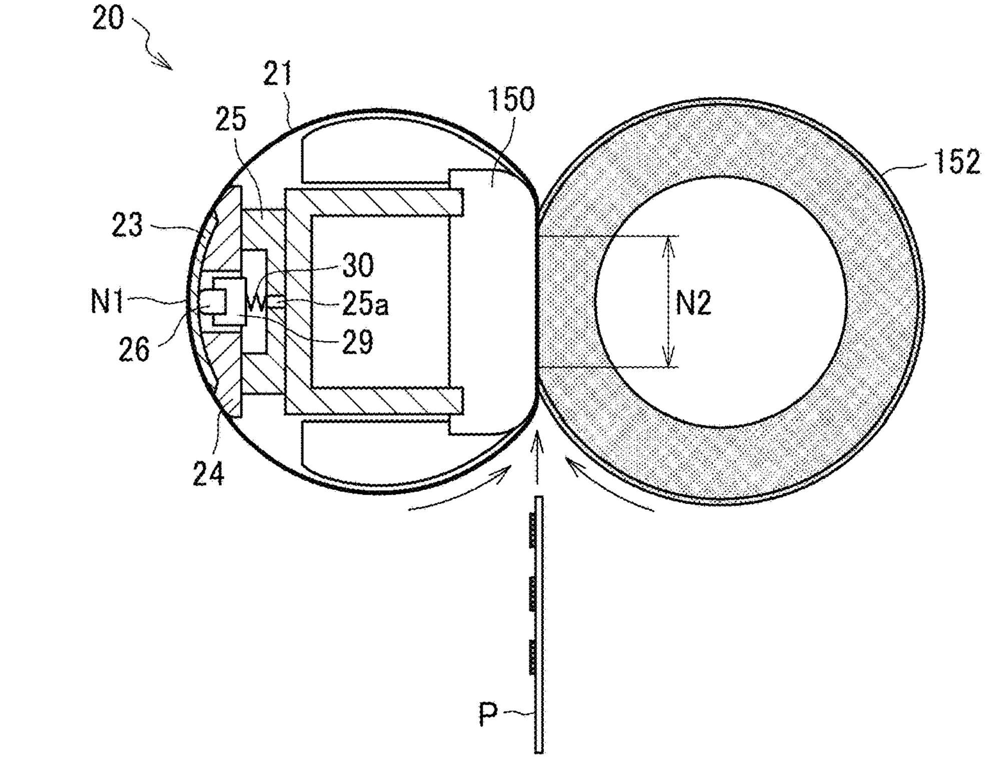
FIG. 18 is a schematic diagram of still another fixing device in which the above embodiments are applicable.
Figure 19:
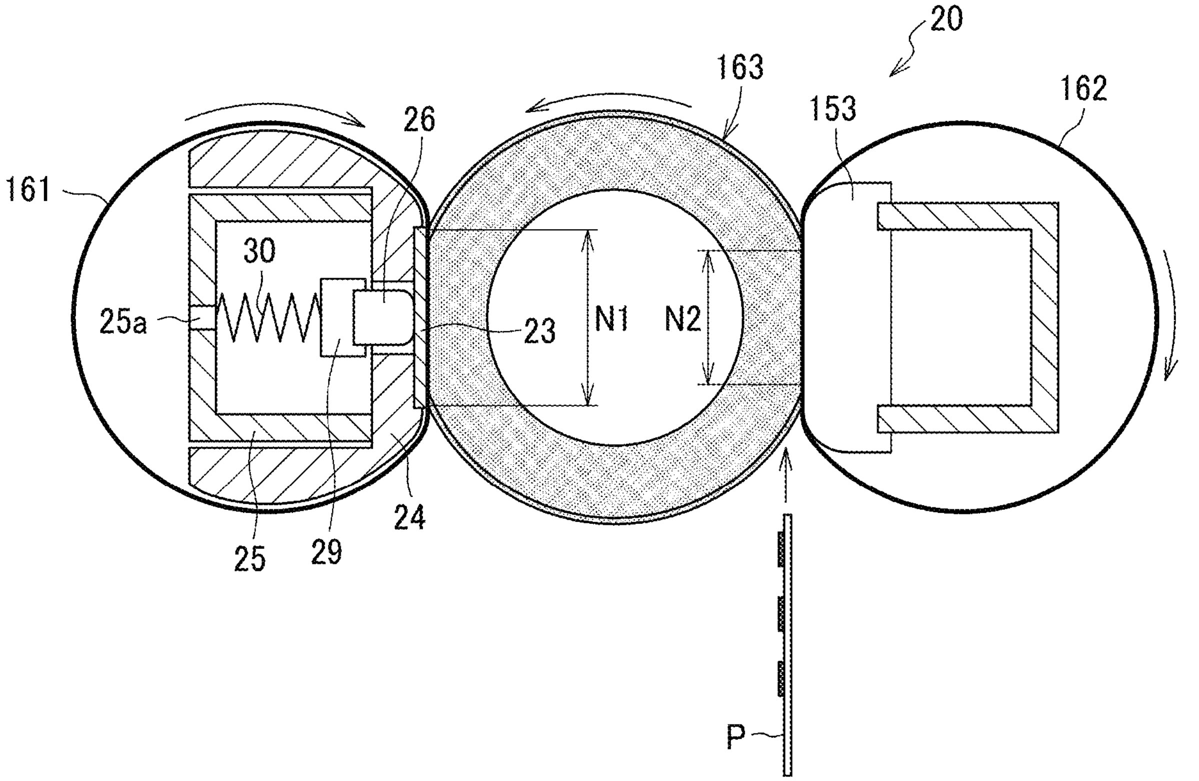
FIG. 19 is a schematic diagram of still another fixing device in which the above embodiments are applicable.

The above-described embodiments are also applicable to fixing devices having configurations different from the configuration of the fixing device in FIG. 2 as illustrated in FIGS. 17 to 19 in addition to the fixing device 20 illustrated in FIG. 2. The configurations of fixing devices illustrated in FIGS. 17 to 19 are described below. In FIGS. 17 to 19, like reference signs are given to elements similar to those illustrated in FIG. 2, and overlapping description may be simplified or omitted as appropriate.

In the example illustrated in FIG. 17, a heating nip portion N1 and a fixing nip are formed at different positions. Specifically, the fixing device 20 includes a small pressure roller 151 and a large pressure roller 152 that are positioned to face each other via the fixing belt 21. The pressure roller 151 contacts the heater 23 via the fixing belt 21 to form the heating nip N1. The pressure roller 152 contacts a nip formation pad 150 via the fixing belt 21 to form the fixing nip N2. In this case, the heater 23 generates heat to heat the fixing belt 21 in the heating nip N1 where the heater 23 contacts the fixing belt 21. The sheet P enters the fixing nip N2 where the fixing belt 21 contacts the pressure roller 152, and an unfixed image on the sheet P is heated and pressed to fix the image on the sheet P.

The fixing device 20 in FIG. 17 includes the temperature sensor 26 to detect the temperature of the heater 23 and the coil spring 30 as the biasing member to bias the temperature sensor 26 toward the heater 23. The stay 25 covers the coil spring 30. As in the above-described embodiments, the stay 25 in the example illustrated in FIG. 17 also has the hole 25*a* to visually observe the end of the coil spring 30 in the face of the stay 25 that receives the end of the coil spring 30. As a result, the worker can easily check the assembled state of the coil spring 30 through the hole 25*a*.

Subsequently, the fixing device in an example illustrated in FIG. 18 omits the above-described pressure roller 151 disposed at a left side in FIG. 17 and includes the heater 23 formed to be arc having a curvature of the fixing belt 21. Other parts of the fixing device illustrated in FIG. 18 are the same as the fixing device 20 illustrated in FIG. 17. In this case, the arc-shaped heater 23 surely maintains a length of the contact area between the fixing belt 21 and the heater 23 in a belt rotation direction to efficiently heat the fixing belt 21. In this example, the stay 25 has the hole 25*a* on a face receiving the end of the coil spring 30 to visually observe the end of the coil spring 30 and easily check the assembled state of the coil spring 30 through the hole 25*a*.

Subsequently, the fixing device 20 illustrated in FIG. 19 is described. The fixing device 20 illustrated in FIG. 19 includes a center roller 163 between two belts 161 and 162. The heater 23 is disposed inside the loop of the left belt 161 in FIG. 19 and is in contact with the center roller 163 via the left belt 161 to form the heating nip N1. A nip formation pad 153 is disposed inside the loop of the right belt 162 in FIG. 19 and is in contact with the center roller 163 via the right belt 162 to form the fixing nip N2. The heater 23 generates heat to heat the center roller 163 in the heating nip N1. The sheet P enters the fixing nip N2, and an unfixed image on the sheet P is heated and pressed to fix the image on the sheet P. In this example, the stay 25 has the hole 25*a* on a face receiving the end of the coil spring 30 to visually observe the end of the coil spring 30 and easily check the assembled state of the coil spring 30 through the hole 25*a*.

The image forming apparatus according to the present disclosure is not limited to the color image forming apparatus including multiple image forming units as illustrated in FIG. 1 and may be a monochrome image forming apparatus including only one image forming unit.

A heating device in which the above-described embodiments are applicable is not limited to the fixing device that is an example of a heating device mounted on an image forming apparatus. The above-described embodiments are applicable to a heating device other than the fixing device. The above-described embodiments may be applied to, for example, a heating device such as a dryer to dry liquid such as ink applied to the sheet in an inkjet type image forming apparatus, a laminator that heats, under pressure, a film serving as a covering member onto the surface of the sheet such as paper, and a heat sealer that seals a seal portion of a packaging material with heat and pressure.

The above-described embodiments of the present disclosure have at least the following aspects.

[First Aspect]

In a first aspect, a heating device includes a first rotator, a second rotator contacting an outer circumferential face of the first rotator to form a nip, a heater heating at least one of the first rotator or the second rotator, a temperature sensor detecting a temperature of the heater, a biasing member biasing the temperature sensor toward the heater and having one end facing the temperature sensor and another end opposite the one end, and a receiver receiving said another end of the biasing member. The receiver is disposed to cover the biasing member so as not to expose the biasing member to the outside of the receiver. The receiver has a contact face contacting said another end of the biasing member and a hole in the contact face, and the hole communicates an inside and an outside of the receiver to be able to visually confirm a position of the biasing member on the contact face in a longitudinal direction of the receiver and a position of the biasing member on the contact face in a direction intersecting the longitudinal direction.

[Second Aspect]

In a second aspect, the receiver in the heating device according to the first aspect has the hole at a position facing said another end of the biasing member on the contact face contacting said another end of the biasing member or inside an inner diameter of said another end of the biasing member on the contact face contacting said another end of the biasing member. The embodiments of FIGS. 10 to 13 have the second aspect.

[Third Aspect]

In a third aspect, the biasing member in the heating device according to the first aspect or the second aspect is a coil spring.

[Fourth Aspect]

In a fourth aspect, a width of the hole in the heating device according to any one of the first to third aspects is smaller than a width of said another end of the biasing member.

[Fifth Aspect]

In a fifth aspect, the receiver in the heating device according to any one of the first to fourth aspects has multiple holes including the hole, and the multiple holes are disposed to face said another end of the biasing member.

[Sixth Aspect]

In a sixth aspect, the multiple holes in the heating device according to fifth aspect are disposed to be line up in a longitudinal direction of the receiver.

[Seventh Aspect]

In a seventh aspect, a distance from one edge of one hole of the multiple holes to another edge of another hole adjacent to the one hole is smaller than a width of said another end of the biasing member.

[Eighth Aspect]

In an eighth aspect, the contact face of the receiver receiving said another end of the biasing member in the heating device according to any one of the first to seventh aspects is a flat face.

[Ninth Aspect]

In a ninth aspect, the receiver in the heating device according to any one of the first to eighth aspects has a bent portion satisfying a following relationship, L>(½)×T, where L is a distance from the bent portion to the hole, and T is a thickness of the receiver.

[Tenth Aspect]

In a tenth aspect, the receiver in the heating device according to any one of the first to ninth aspects has a wall with the contact face and two bent portions disposed at both ends of the wall, and the hole is in the wall and is not in the bent portions.

[Eleventh Aspect]

In an eleventh aspect, a fixing device fixes an unfixed image to a sheet using the heating device according to any one of the first to tenth aspects.

[Twelfth Aspect]

In a twelfth aspect, an image forming apparatus includes the heating device according to any one of the first to tenth aspects or the fixing device according to the seventh aspect.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:

a heater;

a temperature sensor to detect a temperature of the heater;

an elastic body extending from one end to another end to press the temperature sensor against the heater at the one end in a pressing direction; and a receiver:

including a contact face contacting and receiving said another end of the elastic body;

covering the elastic body to conceal the elastic body from outside of the receiver; and including a hole penetrating through the receiver on the contact face, wherein:

said another end of the elastic body is disposed adjacent to the hole, a part of the elastic body is visible from the hole, the receiver includes a bent portion, and a distance L from the bent portion to the hole and a thickness T of the receiver satisfy the following expression, $$L>(1/2)\times T.$$

2. The heating device according to claim 1, wherein:

the hole faces a part of said another end of the elastic body.

3. The heating device according to claim 1, wherein:

the hole is inside a region in which said another end of the elastic body contacts the contact face.

4. The heating device according to claim 1, wherein:

the elastic body is a coil spring.

5. The heating device according to claim 1, wherein:

a width of the hole is smaller than a width of said another end of the elastic body.

6. The heating device according to claim 1, wherein:

the receiver includes multiple holes including the hole, and each of the multiple holes faces different parts of said another end of the elastic body.

7. The heating device according to claim 6, wherein:

wherein the multiple holes are in a longitudinal direction of the receiver.

8. The heating device according to claim 6, wherein:

wherein a distance between neighboring holes of the multiple holes is smaller than a width of said another end of the elastic body.

9. The heating device according to claim 1, wherein:

the contact face of the receiver is flat.

10. The heating device according to claim 1, wherein:

wherein the receiver includes a wall with the contact face and two bent portions at both ends of the wall.

11. A fixing device comprising:

the heating device according to claim 1.

12. An image forming apparatus comprising:

the heating device according to claim 1.

13. The heating device according to claim 1, wherein the receiver includes:

a first wall;

a second wall; and a third wall including the contact face.

14. The heating device according to claim 13, further comprising:

a pressure roller, wherein the first wall and the second wall extend from the heater in a direction away from the pressure roller.

15. The heating device according to claim 13, wherein:

the third wall extends in a direction intersecting the first wall and the second wall.

16. The heating device according to claim 13, wherein:

the bent portion connects the first wall to the third wall.

17. The heating device according to claim 13, wherein the receiver further includes:

another bent portion connecting the second wall to the third wall.

18. The heating device according to claim 13, wherein: the hole is a through hole that penetrates through the third wall.

19. The heating device according to claim 1, wherein: the receiver covers both sides of the elastic body in a direction intersecting the pressing direction.

20. The heating device according to claim 1, wherein: the elastic body is a metal coil spring.

* * * * *